United States Patent
Qin

(10) Patent No.: US 8,760,098 B2
(45) Date of Patent: Jun. 24, 2014

(54) SENSORLESS MOTOR CONTROL

(75) Inventor: Ling Qin, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 707 days.

(21) Appl. No.: 13/078,482

(22) Filed: Apr. 1, 2011

(65) Prior Publication Data

US 2012/0249033 A1    Oct. 4, 2012

(51) Int. Cl.
*H02K 29/06*    (2006.01)

(52) U.S. Cl.
USPC ............. 318/400.32; 318/400.31; 318/700

(58) Field of Classification Search
USPC ..................... 318/400.31, 400.32, 700
See application file for complete search history.

(56) References Cited

U.S. PATENT DOCUMENTS

| | | | | |
|---|---|---|---|---|
| 4,727,468 A | * | 2/1988 | Maekawa | 363/41 |
| 5,886,498 A | | 3/1999 | Sul et al. | |
| 6,014,007 A | * | 1/2000 | Seibel et al. | 318/805 |
| 6,194,864 B1 | * | 2/2001 | Kinpara et al. | 318/805 |
| 6,288,515 B1 | * | 9/2001 | Hiti et al. | 318/722 |
| 6,815,924 B1 | * | 11/2004 | Iura et al. | 318/727 |
| 7,202,629 B2 | | 4/2007 | Jadot et al. | |
| 7,208,908 B2 | | 4/2007 | Anghel | |
| 7,339,344 B2 | | 3/2008 | Borisavljevic | |
| 7,646,164 B2 | | 1/2010 | Malrait et al. | |
| 7,808,201 B2 | | 10/2010 | Borisavljevic | |
| 8,253,365 B2 | * | 8/2012 | Yeh | 318/490 |
| 2004/0056487 A1 | * | 3/2004 | Sarlioglu et al. | 290/52 |
| 2005/0104552 A1 | * | 5/2005 | Arai et al. | 318/801 |
| 2006/0279248 A1 | * | 12/2006 | Borisavljevic | 318/723 |
| 2007/0046246 A1 | * | 3/2007 | Borisavljevic | 318/723 |
| 2008/0042612 A1 | * | 2/2008 | Ho | 318/720 |
| 2011/0012544 A1 | | 1/2011 | Schulz et al. | |
| 2011/0298405 A1 | * | 12/2011 | Costanzo et al. | 318/400.23 |
| 2012/0098472 A1 | * | 4/2012 | Wrobel et al. | 318/400.11 |
| 2012/0229058 A1 | * | 9/2012 | Kim | 318/400.02 |
| 2013/0043811 A1 | * | 2/2013 | Qin | 318/400.02 |

OTHER PUBLICATIONS

"Sensorless V/f Control of High-speed Surface Permanent Magnet Synchronous Motor Drives with Two Novel Stabilising Loops for Fast Dynamics and Robustness," IET Electr. Power Appl., vol. 4, Iss. 3, 2010, pp. 149-157 (Ancuti, et al.).

"A Comparison between V/f Control and Position-Sensorless Vector Control for the Permanent Magnet Synchronous Motor," Proc. of the Power Conversion Conf., 2002, PCC Osaka 2002, pp. 1310-1315 (Itoh, et al.).

"A Sensorless, Stable V=f Control Method for Permanent-Magnet Synchronous Motor Drives," IEEE Trans. on Ind. Appl., vol. 39, No. 3, May/Jun. 2003, pp. 783-791 (Perera, et al.).

* cited by examiner

*Primary Examiner* — Kawing Chan
(74) *Attorney, Agent, or Firm* — John R. Pessetto; Wade J. Brady, III; Frederick J. Telecky, Jr.

(57) ABSTRACT

An method for driving a motor is provided. A plurality of pulse width modulation (PWM) signals are generated from a commanded voltage signal and a commanded angle signal, and these PWM signal are used to drive a motor (which has a plurality of phases). Currents through the phases of the motor are measured, and a Park transformation is performed on the measured currents to determine a projection current measurement. Based at least in part on the projection current measurement, the adjusting the commanded voltage signal and the commanded angle signal can be adjusted.

12 Claims, 3 Drawing Sheets

SENSORLESS MOTOR CONTROL

TECHNICAL FIELD

The invention relates generally to motor control and, more particularly, to sensorless control of a permanent magnet synchronous motor (PMSM) or brushless direct current motor (BLDC).

BACKGROUND

Turning to FIG. 1, a conventional system 100 can be seen. This system 100 generally comprises a motor controller 102, a power supply 104, an inverter 106, and a motor 108 (which is typically a PMSM or BLDC). In operation, the motor controller 102 provides generally continuous pulse width modulation (PWM) signals (i.e., 6 PWM signals if the motor 108 is a three-phase motor). These PWM signals are used to control the inverter 106, so that the inverter 106 can provide the commanded voltage to each phase of motor 108 from power supply 104.

The motor controller 102 provides control of motor 108 (through the application of the PWM signals) based on a field-oriented control (FOC) algorithm. For conventional FOC control, there are typically three control loops (one speed loop and two current loops) that are employed to provide adjustments. Typically, the observer 120 forms a portion of the speed loop and determines a feedback speed or feedback signal ω from the PWM signals (provided to the inverter 106) and from the motor 108. A difference between this feedback signal ω and a reference speed or reference signal ω* (which is determined by assert 110-1) is adjusted by the proportional-integral (PI) controller 112-1 to generate the reference torque current $i_q$* for the quadrature axis or q-axis. Additionally, a field weakener 114 provides the reference field current $i_d$* for the direct axis d-axis (in normal operation, $i_d$*=0). The observer 120 also determined the rotor position or angle and provides the angle signal θ to the Park converter 118 and PWM controller 116. The current loops generally includes the Park converter 118, which determines currents $i_d$ and $i_q$ from phase current measurements and the angle signal θ. These currents $i_d$ and $i_q$ are then compared to or subtracted from the reference current $i_d$* and $i_q$* by adders 110-2 and 110-3, respectively, to generate errors $\Delta I_d$ and $\Delta I_q$. These errors $\Delta I_d$ and $\Delta I_q$ can then be further adjusted by PI controllers 112-2 and 112-3, and the commanded voltages $V_d$ and $V_q$, along with the angle signal θ (which form a voltage command vector $\vec{V}$), can be used to generate the PWM signals, and generation of the PWM signals is usually accomplished by an inverse Park transformation (performed by an inverse Park converter within PWM controller 116) and a space vector PWM generator (within the PWM controller 116) so as to generate three phase voltages.

There are some drawbacks, however, to using conventional, sensorless FOC controls for PMSMs. Namely, the observer 120 is usually the limiting feature because of computationally intensive processes performed by the observer 120 and because of the complexity of the system 100 with simultaneous current and/or voltage measurements. Usually, there are multiple observers employed (i.e., one for speed/position and one for online parameter estimation), and these observers will oftentimes compete with one another, creating performance degradation, largely because decoupling the observers is difficult. Therefore, it is desirable to have a sensorless FOC-type system with robust performance and a low cost.

Some examples of conventional systems are: U.S. Pat. No. 5,886,498; U.S. Pat. No. 7,202,629; U.S. Pat. No. 7,208,908; U.S. Pat. No. 7,339,344; U.S. Pat. No. 7,646,164; U.S. Pat. No. 7,808,201; U.S. Patent Pre-Grant Publ. No. 2011/0012544; Ancuti et al., "Sensorless V/f control of high-speed surface permanent magnet synchronous motor drives with two novel stabilizing loops for fast dynamics and robustness," IET Electr. Power Appl., Vol. 4, Iss. 3, 2010, pp. 149-157; Itoh et al., "A comparison between V/f control and position-sensorless vector control for the permanent magnet synchronous motor," Proc. of the Power Conversion Conf., 2002. PCC Osaka 2002, pg. 1310-1315; and Perera et al., "A Sensorless, Stable V=f Control Method for Permanent-Magnet Synchronous Motor Drives", IEEE Trans. on Ind. Appl., Vol. 39, No. 3, May/June 2003.

SUMMARY

An embodiment of the present invention, accordingly, provides a method. The method comprises generating a plurality of pulse width modulation (PWM) signals from a commanded voltage signal and a commanded angle signal; driving a motor with the plurality of PWM signals, wherein the motor has a plurality of phases; measuring currents through the phases of the motor; performing a Park transformation on the measured currents to determine projection current measurements; and adjusting the commanded voltage signal and the commanded angle signal based at least in part on the projection current measurement.

In accordance with an embodiment of the invention, the method further comprises generating the commanded voltage signal and the commanded angle signal from a reference signal, and wherein the projection current measurement further comprises a field current measurement.

In accordance with an embodiment of the invention, the step of generating the commanded voltage signal and the commanded angle signal from the reference signal further comprises: generating the commanded voltage signal from a frequency of the reference signal; and integrating the reference signal to determine the commanded angle signal.

In accordance with an embodiment of the invention, the step of adjusting further comprises: controlling the field current measurement with a proportional-integral (PI) controller to generate a control signal; adding the control signal to the commanded voltage signal; and subtracting the control signal from the commanded angle signal.

In accordance with an embodiment of the invention, the step of driving further comprises applying the plurality of PWM signals to an inverter.

In accordance with an embodiment of the invention, the projection current measurement further comprises a field current measurement, and wherein the step of generating further comprises performing an inverse Park transformation on the voltage and commanded angle signals.

In accordance with an embodiment of the invention, the step of adjusting further comprises: reducing a command voltage if the field current measurement is greater than zero, wherein the command voltage corresponds to the PWM signals; weakening the magnetic field of the motor if the field current measurement is greater than zero; and increasing the command voltage if the field current measurement is greater than zero.

In accordance with an embodiment of the invention, the method further comprises generating the commanded voltage signal and the commanded angle signal from a reference signal, and wherein the projection current measurement further comprises a torque current measurement.

In accordance with an embodiment of the invention, an apparatus is provided. The apparatus comprises a feedback loop that determines a projection current measurement by performing a Park transformation on measured currents and that generates a control signal; a voltage generator that generates a commanded voltage signal from a reference signal; an integrator that generates a commanded angle signal from the reference signal; a first adder that adds the commanded voltage signal to the control signal; a second adder that subtracts the control signal from the commanded angle signal; and a PWM controller that generates a plurality of PWM signals in response to outputs from the first and second adders.

In accordance with an embodiment of the invention, the projection current measurement further comprises a field current measurement, and wherein the feedback loop further comprises: a Park converter that determines the field current measurement from the measured currents; a field weakener that weakens a magnetic field if the field current measurement is less than zero; and a PI controller that generates the control signal based at least in part on the field current measurement.

In accordance with an embodiment of the invention, the PWM controller further comprises: an inverse Park converter that performs an inverse Park transformation on the commanded voltage signal and the commanded angle signal; and a space vector PWM (SVPWM) generator that generates the plurality of PWM signals based at least in part on outputs from the inverse Park converter.

In accordance with an embodiment of the invention, the voltage generator, the integrator, the first adder, the second adder, the Park converter, the PI controller, and the inverse Park converter are implemented in software that is embodied on a processor and memory.

In accordance with an embodiment of the invention, the apparatus further comprises: an inverter that is coupled to the SVPWM so as to receive the plurality of PWM signals; and a motor that is coupled to the inverter.

In accordance with an embodiment of the invention, the motor further comprises a permanent magnet synchronous motor (PMSM).

In accordance with an embodiment of the invention, an apparatus is provided. The apparatus comprises a processor having a memory with a computer program embodied thereon, the computer program including: computer code for generating a commanded voltage signal from a reference signal; computer code for integrating the reference signal to generate a commanded angle signal; computer code performing a Park transformation on measured currents to determine a projection current measurement; computer code for generating a control signal from the projection current measurement; computer code for adjusting the commanded voltage signal and the commanded angle signal based on the projection current measurement; and computer code for performing an inverse Park transformation on the adjusted voltage and commanded angle signals to generate drive signals; and a PWM generator that is coupled to the processor so as to receive the drive signals and generate a plurality of PWM signals from the drive signals.

In accordance with an embodiment of the invention, the PWM generator further comprises an SVPWM generator.

In accordance with an embodiment of the invention, the projection current measurement further comprises a field current measurement, and wherein the computer code for adjusting further comprises: computer code for controlling the field current measurement with a PI controller to generate the control signal; computer code for adding the control signal to the commanded voltage signal; and computer code for subtracting the control signal from the commanded angle signal.

In accordance with an embodiment of the invention, the apparatus further comprises: an inverter that is coupled to the SVPWM so as to receive the plurality of PWM signals; and a motor that is coupled to the inverter.

In accordance with an embodiment of the invention, the motor further comprises a PSMS.

In accordance with an embodiment of the invention, the apparatus further comprises: an inverter that is coupled to the SVPWM so as to receive the plurality of PWM signals; and a motor that is coupled to the inverter.

In accordance with an embodiment of the invention, the computer code for adjusting further comprises: computer code for reducing a command voltage if the field current measurement is greater than zero, wherein the command voltage corresponds to the PWM signals; computer code for weakening the magnetic field of the motor if the field current measurement is greater than zero; and computer code for increasing the command voltage if the field current measurement is greater than zero.

In accordance with an embodiment of the invention, the projection current measurement further comprises a torque current measurement.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
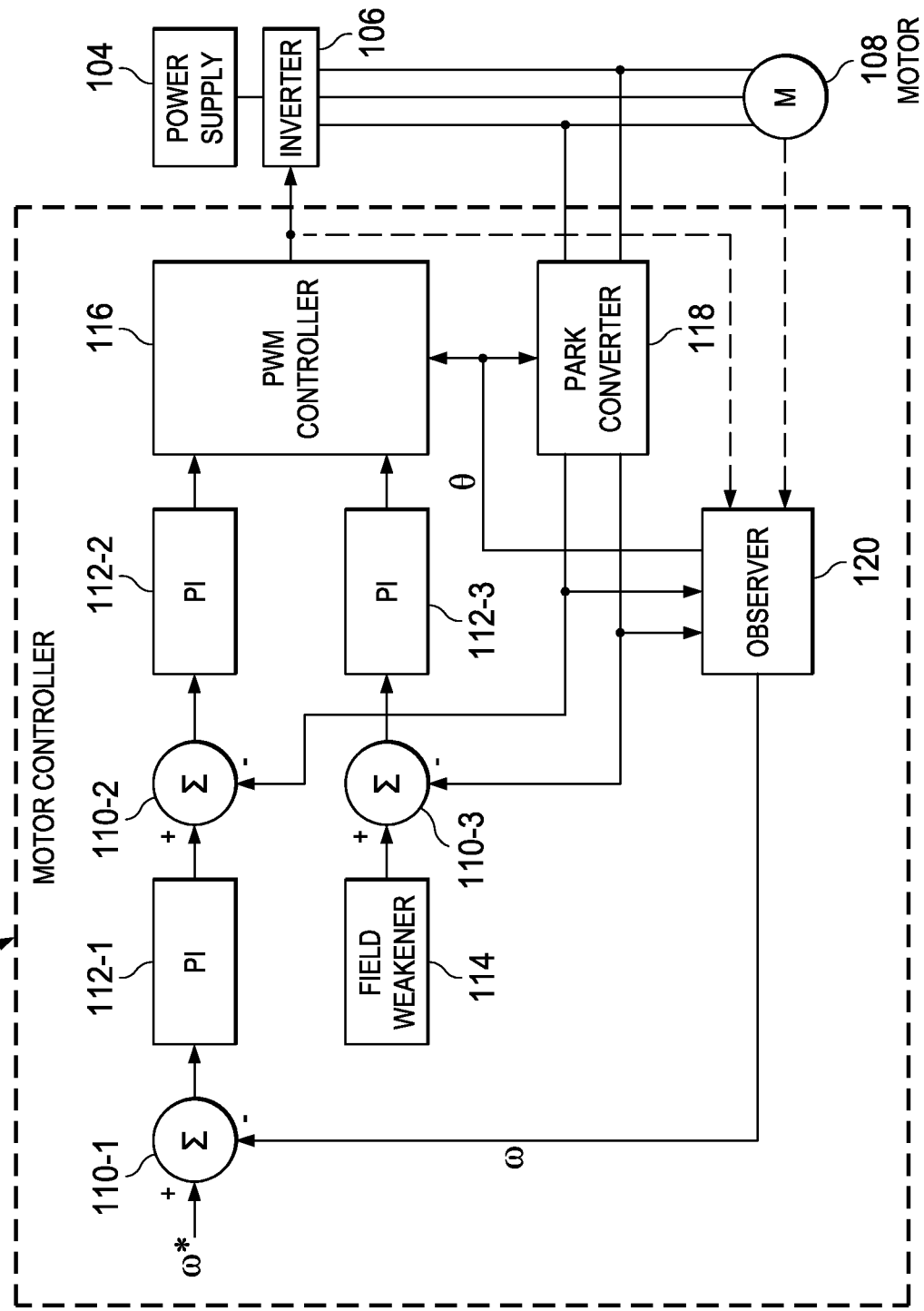
FIG. 1 is an example of a conventional system.

Refer now to the drawings wherein depicted elements are, for the sake of clarity, not necessarily shown to scale and wherein like or similar elements are designated by the same reference numeral through the several views.

Figure 2:
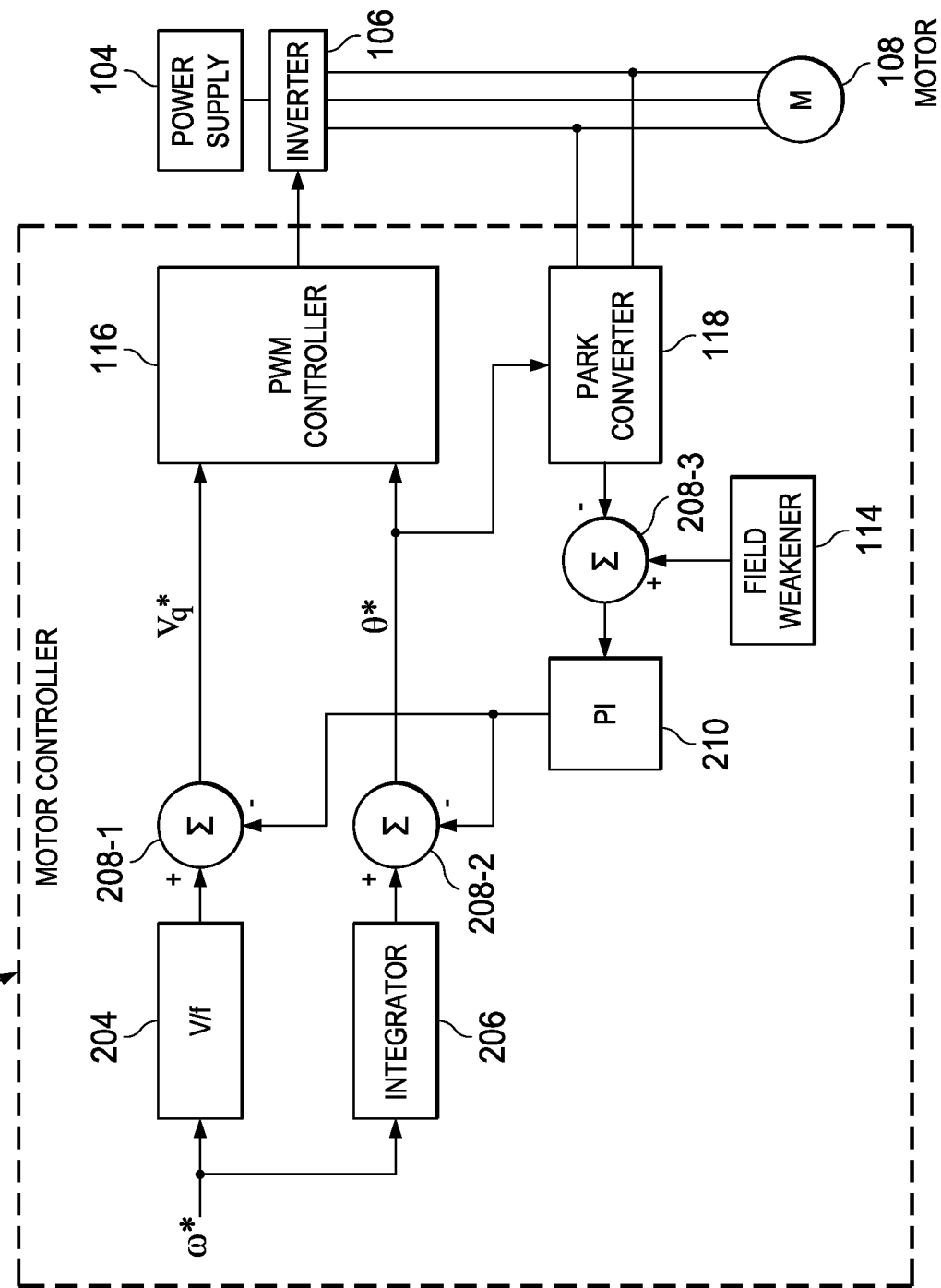
FIG. 2 is an example of a system in accordance with an embodiment of the present invention.

Turning to FIG. 2, an example of a system 200 in accordance with an embodiment of the present invention is provided. Contrasting motor controller 102 to motor controller 202, the organization and structure is completely different in that motor controller 202 utilizes a hybrid volt-per-hertz (V/f) and FOC control, thereby eliminating the need for observer 120. With motor controller 202, there is one control loop that includes Park converter 118. Generally, in operation, a voltage generator 204 and integrator 206 are employed to generate the commanded voltage signal $V_q^*$ and commanded angle signal $\theta^*$, respectively, from reference speed or reference signal ω*. The control loop can then provide adjustments to the commanded voltage signal $V_q^*$ and commanded angle signal θ* by way of adders 208-1 and 208-2, which adds and subtracts a control signal to and from the commanded voltage signal $V_q^*$ and commanded angle signal θ* (respectively).

Typically, the control signal is determined from phase current measurements. Namely, Park converter performs a Park transformation on these measured phase currents to generate projection currents $I_d$ and $I_q$ (which correspond to the d-axis and q-axis, respectively). For the system 200, field current $I_d$ is used, while torque current $I_q$ can be ignored. Alternatively, current torque $I_q$ can be used instead of field current $I_d$. Typically, direct current (DC) motors have a totally independent field and torque control, and a FOC algorithm generally controls a PMSM or AC Induction Motor (ACIM). However, currents $I_d$ and $I_q$ are actually the projections of the resultant current on d-axis and q-axis, so there are not any true independencies. Hence, a single control for projection currents $I_d$ and $I_q$ is generally sufficient. So, in this example, the field current $I_d$ can be adjusted by field weakener 114 (normally, $I_d$=0) and adder 208-3 (i.e., based on the speed of the motor), and a PI control 210 can be applied to generate the control signal.

One reason for the simplicity of motor controller 202 is that some approximations can be made to simplify the system 200 (as compared to system 100). From currents $I_d$ and $I_q$, the commanded voltages $V_d$ and $V_q$ can be determined by the following equations:

$$V_d = I_d R_s + L_d \cdot \frac{d i_d}{dt} - \omega \Psi_q, \quad (1)$$

$$V_q = I_q R_s + L_q \cdot \frac{d i_q}{dt} + \omega \Psi_d, \quad (2)$$

$$\Psi_d = I_d L_d + \Psi_m, \quad (3)$$

and $$\Psi_q = I_q L_q, \quad (4)$$

where $\Psi_d$ and $\Psi_q$ are flux linkages for the d-axis and q-axis, respectively, $L_d$ and $L_q$ are stator inductances for the d-axis and q-axis, respectively, $\Psi_m$ is the flux linkage of the permanent magnet, and $R_s$ is the stator resistance. These stator voltages $V_d$ and $V_q$ are typically used to generate the PWM signals for inverter 106. However, it should be noted that magnetic fluxes generated by $L_d^* I_d$ and $L_q^* I_q$ are typically very small (i.e., ≈0), and voltage generated by $i_q^* R_s$ (even under full load) is very small (i.e., ≈0), compared with the flux linkage of the permanent magnet $\Psi_m$. Thus, equations (1) through (4) can be reduced as follows:

$$\Psi_d = I_d L_d + \Psi_m \approx \Psi_m \quad (5)$$

$$\Psi_q = I_q L_q \approx 0, \quad (6)$$

$$V_d = I_d R_s + L_d \cdot \frac{d i_d}{dt} - \omega \Psi_q \approx I_d R_s \approx 0, \quad (7)$$

and $$V_q = I_q R_s + L_q \cdot \frac{d i_q}{dt} - \omega \Psi_d \approx I_q R_s + \omega \Psi_d \approx \omega \Psi_d, \quad (8)$$

So, $$V \approx V_q \approx \omega \Psi_d, \quad (9)$$

Figure 3:
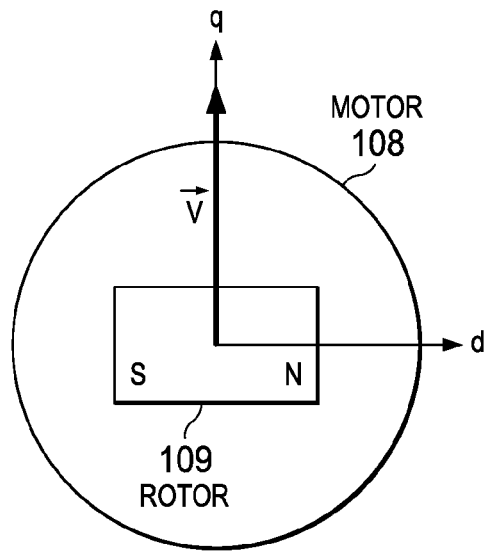
FIG. 3-5 are illustrations of stabilization control of the motor of FIG. 2.

Equation (9), thus, implies that V/f control (as shown in FIG. 2) would be appropriate. Moreover, equations (5) through (8) imply that the position (i.e., angle signal θ) of the voltage command vector $\vec{V}$ (which is generated by the PWM signals) is generally aligned with the q-axis of the rotor 109, as shown in FIG. 3.

Figure 4:
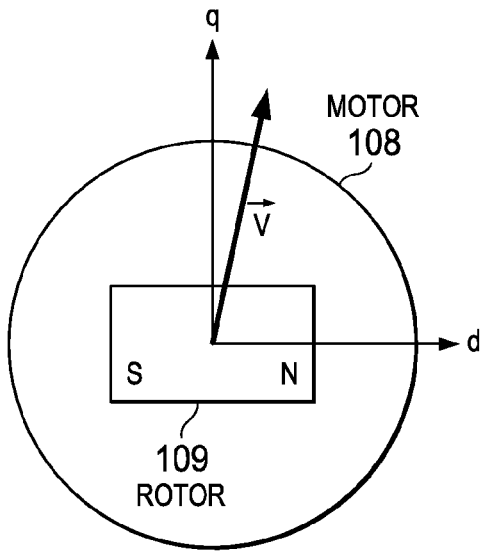
Figure 5:
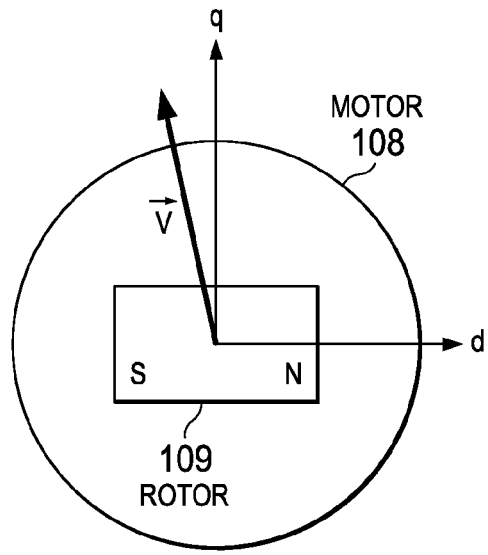

Knowing that the voltage command vector $\vec{V}$ should be approximately aligned with the q-axis of the rotor 109, to achieve a maximum theoretical torque, stabilization would also be relatively easy to achieve. Under these circumstances, a projection current $I_d$ that is greater than zero would indicate a voltage command vector $\vec{V}$ having a positive real synchronous angle (as shown in FIG. 4), and a stator current $I_d$ that is less than zero than would indicate a voltage command vector $\vec{V}$ having a negative real synchronous angle (as shown in FIG. 5). For the positive real synchronous angle, the projection current $I_d$ contributes unexpected magnetic saturations, so the commanded voltage (which is generated by the PWM signals and applied to the motor 108 by the inverter 106) can be reduced to compensate. For the negative real synchronous angle, the magnetic field can be weakened by the field weakener 114 and the command voltage can be increased.

Implementing the motor controller 202 can also be accomplished in a number of ways. For example, each element of motor controller can be implemented software that is embodied on a processor (i.e., digital signals processor or DSP) and memory, implemented in hardware, or some combination thereof. Typically, the motor controller 202 includes a processor and memory having the voltage generator 204, integrator 206, adders 208-1, 208-2, and 208-3, PI control 210, field weakener 114, Park converter 118, and inverse Park converter (part of the PWM controller 116) and SVPWM (part of the PWM controller 116) implemented in software.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method comprising:
    generating a plurality of pulse width modulation (PWM) signals from a commanded voltage signal and an commanded angle signal;
    driving a motor with the plurality of PWM signals, wherein the motor has a plurality of phases;
    measuring currents through the phases of the motor;
    performing a Park transformation on the measured currents to determine a projection current measurement; and
    adjusting the commanded voltage signal and the commanded angle signal based at least in part on the projection current measurement;
    generating the commanded voltage signal from a frequency of the reference signal;
    integrating the reference signal to determine the commanded angle signal;
    wherein the projection current measurement further comprises a field current measurement;
    controlling the field current measurement with a proportional-integral (PI) controller to generate a control signal;

adding the control signal to the commanded voltage signal; and subtracting the control signal from the commanded angle signal.

2. The method of claim 1, wherein the step of driving further comprises applying the plurality of PWM signals to an inverter.

3. The method of claim 2, wherein the step of generating further comprises performing an inverse Park transformation on the voltage and commanded angle signals.

4. An apparatus comprising:
a feedback loop that determines a projection current measurement by performing a Park transformation on measured currents and that generates a control signal;
a voltage generator that generates a commanded voltage signal from a reference signal;
an integrator that generates a commanded angle signal from the reference signal;
a first adder that adds the commanded voltage signal to the control signal;
a second adder that subtracts the control signal from the commanded angle signal; and
a PWM controller that generates a plurality of PWM signals in response to outputs from the first and second adders.

5. The apparatus of claim 4, wherein the projection current measurement further comprises a field current measurement, and wherein the feedback loop further comprises:
a Park converter that determines the field current measurement from the measured currents;
a field weakener that weakens a magnetic field if the field current measurement is less than zero; and
a PI controller that generates the control signal based at least in part on the field current measurement.

6. The apparatus of claim 5, wherein the PWM controller further comprises:
an inverse Park converter that performs an inverse Park transformation on the commanded voltage signal and the commanded angle signal; and
a space vector PWM (SVPWM) generator that generates the plurality of PWM signals based at least in part on outputs from the inverse Park converter.

7. The apparatus of claim 6, wherein the voltage generator, the integrator, the first adder, the second adder, the Park converter, the PI controller, and the inverse Park converter are implemented in software that is embodied on a processor and memory.

8. The apparatus of claim 6, wherein the apparatus further comprises:
an inverter that is coupled to the SVPWM so as to receive the plurality of PWM signals; and
a motor that is coupled to the inverter.

9. The apparatus of claim 8, wherein the motor further comprises a permanent magnet synchronous motor (PMSM).

10. An apparatus comprising:
a processor having a memory with a computer program embodied thereon, the computer program including:
computer code for generating a commanded voltage signal from a reference signal;
computer code for integrating the reference signal to generate a commanded angle signal;
computer code performing a Park transformation on measured currents to determine a projection current measurement;
computer code for generating a control signal from the projection current measurement;
computer code for adjusting the commanded voltage signal and the commanded angle signal based on the projection current measurement; and
computer code for performing an inverse Park transformation on the adjusted voltage and commanded angle signals to generate drive signals; and
a PWM generator that is coupled to the processor so as to receive the drive signals and generate a plurality of PWM signals from the drive signals;
wherein the PWM generator further comprises an SVPWM generator;
wherein the projection current measurement further comprises a field current measurement, and wherein the computer code for adjusting further comprises:
computer code for controlling the field current measurement with a PI controller to generate the control signal;
computer code for adding the control signal to the commanded voltage signal; and
computer code for subtracting the control signal from the commanded angle signal.

11. The apparatus of claim 10, wherein the apparatus further comprises:
an inverter that is coupled to the SVPWM so as to receive the plurality of PWM signals; and
a motor that is coupled to the inverter.

12. The apparatus of claim 11, wherein the motor further comprises a PSMS.

* * * * *